Duryea & Ennis,
Steam-Boiler Furnace,

Nº 64,294. Patented Apr. 30, 1867.

Witnesses:

Inventor:

United States Patent Office.

WRIGHT DURYEA, OF GLEN COVE, NEW YORK, AND WILLIAM ENNIS, OF HUDSON, NEW JERSEY.

*Letters Patent No. 64,294, dated April 30, 1867.*

IMPROVEMENT IN FURNACES FOR BURNING SAW-DUST, &c.

*The Schedule referred to in these Letters Patent and making part of the same.*

TO ALL WHOM IT MAY CONCERN:

Be it known that we, WRIGHT DURYEA, of Glen Cove, in the county of Queens, and State of New York, and WILLIAM ENNIS, of Hudson, in the county of Hudson, and State of New Jersey, have invented a certain new and useful Improvement on Heat Generators, Furnaces, or Stoves, of which the following is a full, clear, and exact description, reference being had to the accompanying drawing, forming part of this specification, and in which—

Figure 3:
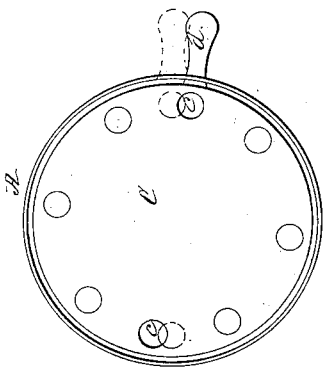
Figure 2:
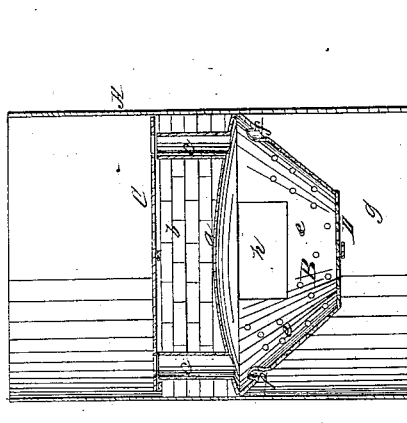
Figure 1:
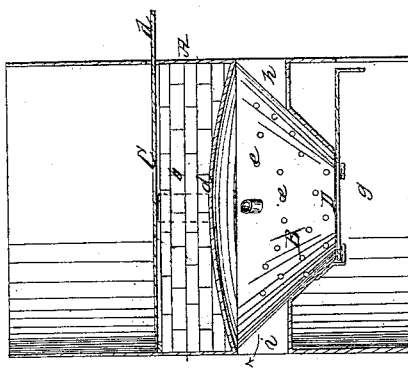

Figures 1 and 2 represent vertical sections, at right angles to each other, of a heat generator, constructed according to our improvement; and Figure 3, a plan of the same.

Like letters indicate like parts throughout the several figures.

Our improvement, which, as a heat generator, is applicable to a variety of purposes, has reference to the burning of coal-dust, waste peat, saw-dust, spent tan, or other similar or refuse materials, by means of a furnace or fire-chamber, with its pertaining parts similar, so far as their general character is concerned, to that or those described in Letters Patent of the United States issued to Joseph Heindle, assignee of Ferdinand Braun, bearing date May 17, 1864, but differing therefrom in several important particulars or details, the nature of our improvement consisting in a novel combination of perforated conical fire-pot or chamber, with a dome-shaped reflector or top, shaking grate, and regulating plate or valve, controlling the feed apertures of the fuel to the fire-pot. Also, in combination with a grate or fire-chamber of the character described, of passages for burning or utilizing the carbonic oxide, by the introduction of atmospheric air above the fire and below the dome or roof.

Referring to the accompanying drawing, A represents the outer shell or case of the generator, built or made of any suitable material and size, according to the purpose for which it is designed, and which may be simply for supplying hot air for heating buildings, for steam boiler or other purposes. Said case is or may be of circular form, its upper portion above the dome-shaped roof $a$, and filling or brick-work, $b$, serving as a drying and storing receptacle or supply-chamber for the loose fuel, by feed passages or tubes, $c$, to the conical fire-chamber B. A regulating-plate, or valve, C, having openings in it corresponding to the feed passages $c$, and made capable of a horizontal vibratory motion through a handle, $d$, is arranged above the filling $b$, to shut off and open or regulate the supply of the fuel from the drying-chamber above to the fire-pot or chamber B. This conical fire-chamber has a series of perforations, $e$, made in it, to facilitate the admission of air to effect combustion, which is sensibly aided, in using fuel of the description mentioned, by the dome-shaped reflector or arched roof $a$, while larger air inlets, $f$, arranged intermediately and below the fuel tubes $c$, answer to admit air above the fire and below the dome, for burning the carbonic oxide, while, by their arrangement, they fail to pass off unconsumed the loose fuel entering by the tubes $c$. Said fire-chamber B is also provided with a shaking and, it may be, dumping grate, D, for aiding not only in clearing the fire and maintaining the requisite draught, but for, by agitating it, working down the fuel and keeping up the run or supply of the same to and down the conical sides of the fire-pot from the fuel-drying and storing receptacle above.

Such a construction and combination of parts we find from experience most advantageous for burning fuel of the character here mentioned. The other parts or details not hereinbefore described, but represented in the drawing, consist of the ash-pit $g$, opening $h$, designed to be closed by a door after the fire has been fairly started, and smoke outlet $i$.

What we claim as our invention, and desire to secure by Letters Patent, is—

1. The combination of the perforated conical fire-pot or chamber B, with its dome-shaped roof $a$, and shaking grate D, fuel-feeding tubes or passages $c$, communicating with a drying-chamber or receptacle above, and regulating-plate or valve C, substantially as specified.

2. The combination, with the fire-chamber B, and fuel-supply passages $c$, of the air inlets $f$, arranged relatively to the passages $c$ and dome $a$, essentially as herein set forth.

WRIGHT DURYEA,
WILLIAM ENNIS.

Witnesses.
J. W. COOMBS,
G. W. REED.